March 16, 1937. B. SASSEN 2,074,095
COMBINED PATTERN CONTROLLED MACHINE TOOL
Filed April 2, 1935 5 Sheets-Sheet 1

INVENTOR.
BERNARD SASSEN
BY
*H. K. Parsons*
ATTORNEY.

March 16, 1937. B. SASSEN 2,074,095
COMBINED PATTERN CONTROLLED MACHINE TOOL
Filed April 2, 1935 5 Sheets-Sheet 2

INVENTOR.
BERNARD SASSEN
BY
*H K Parsons*
ATTORNEY.

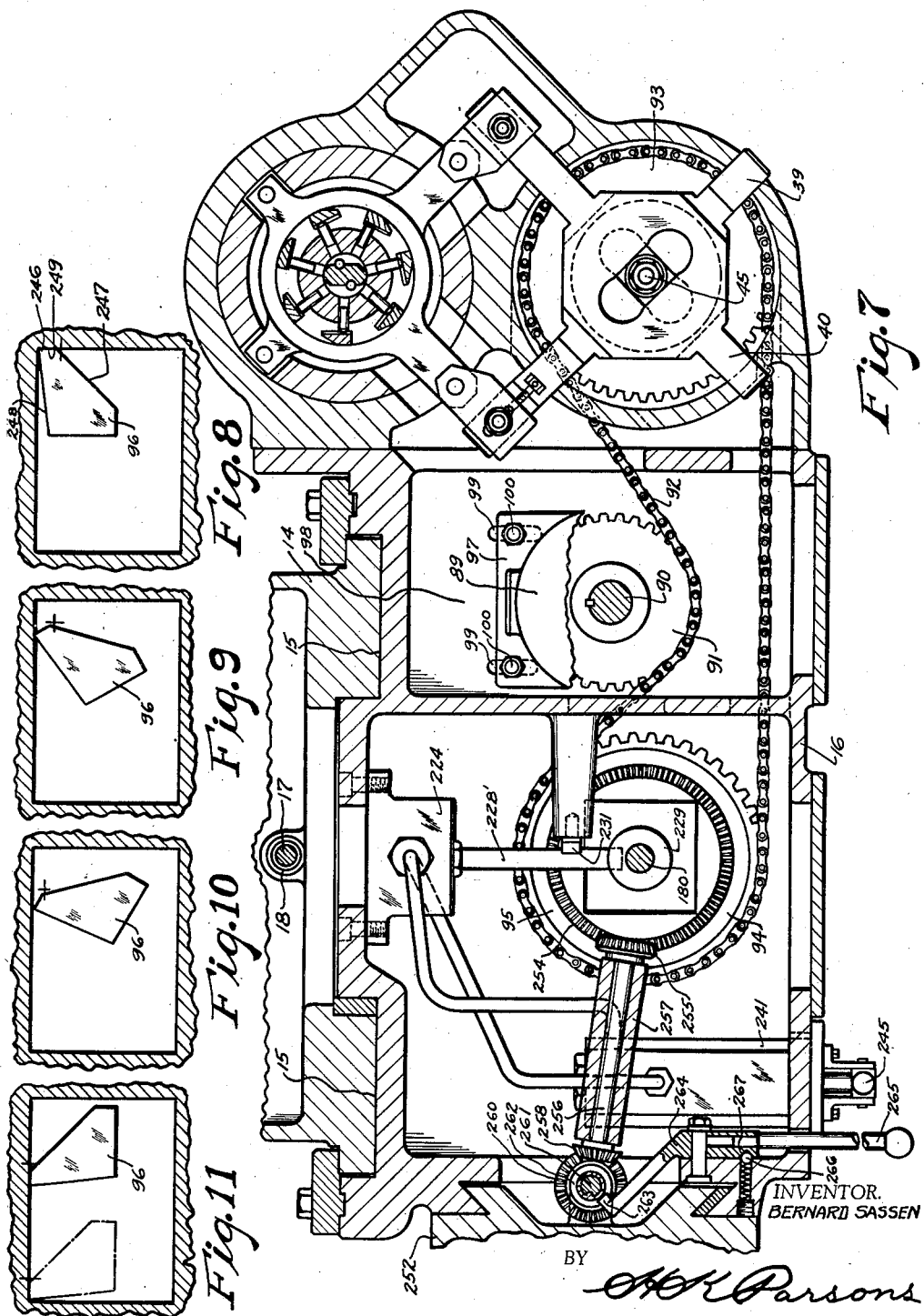

March 16, 1937.  B. SASSEN  2,074,095
COMBINED PATTERN CONTROLLED MACHINE TOOL
Filed April 2, 1935   5 Sheets-Sheet 4
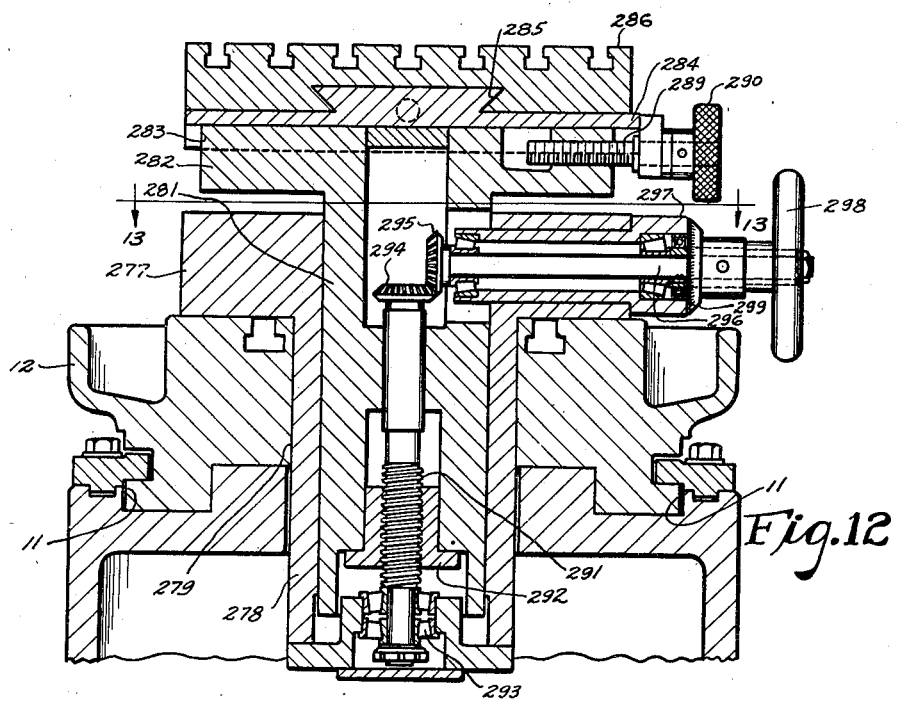
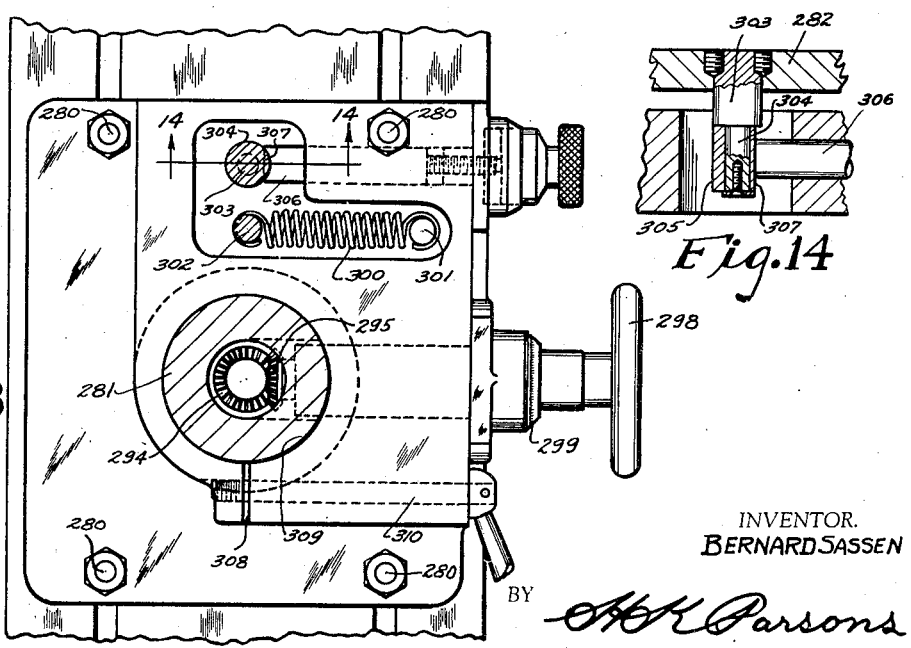
INVENTOR.
BERNARD SASSEN
BY
ATTORNEY.

Patented Mar. 16, 1937

2,074,095

UNITED STATES PATENT OFFICE 2,074,095

COMBINED PATTERN CONTROLLED MACHINE TOOL

Bernard Sassen, Cincinnati, Ohio, assignor to The Cincinnati Milling Machine Co., Cincinnati, Ohio, a corporation of Ohio Application April 2, 1935, Serial No. 14,294

19 Claims. (Cl. 29—33)

This invention relates to a combined machine tool and more particularly to a machine in which the several different tools thereof may be governed by a common pattern controlled means.

One of the objects of this invention is to produce a machine that is especially adapted for roughing out and finishing blanking dies by pattern controlled means.

Another object of this invention is to simplify the manufacture of blanking dies whereby all machining operations may be carried out in a single machine, thereby eliminating a multiplicity of set-ups and transfers.

A further object of this invention is to provide a machine which may be utilized for performing a multiplicity of different machining operations, such as milling, drilling, shaping, grinding, trepanning and the like, and to provide means for pattern controlling any of these operations which are susceptible to such control.

A still further object of this invention is to provide in a machine of the character described improved means for transferring or indexing work from one machining position to another.

An additional object of this invention is to provide in combination with pattern controlling mechanism, improved means for supporting a pattern for relative adjustment with respect to a tracer so that variations in the size of the work with respect to a master may be easily accomplished.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 3:
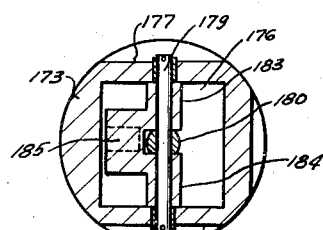
Figure 2:
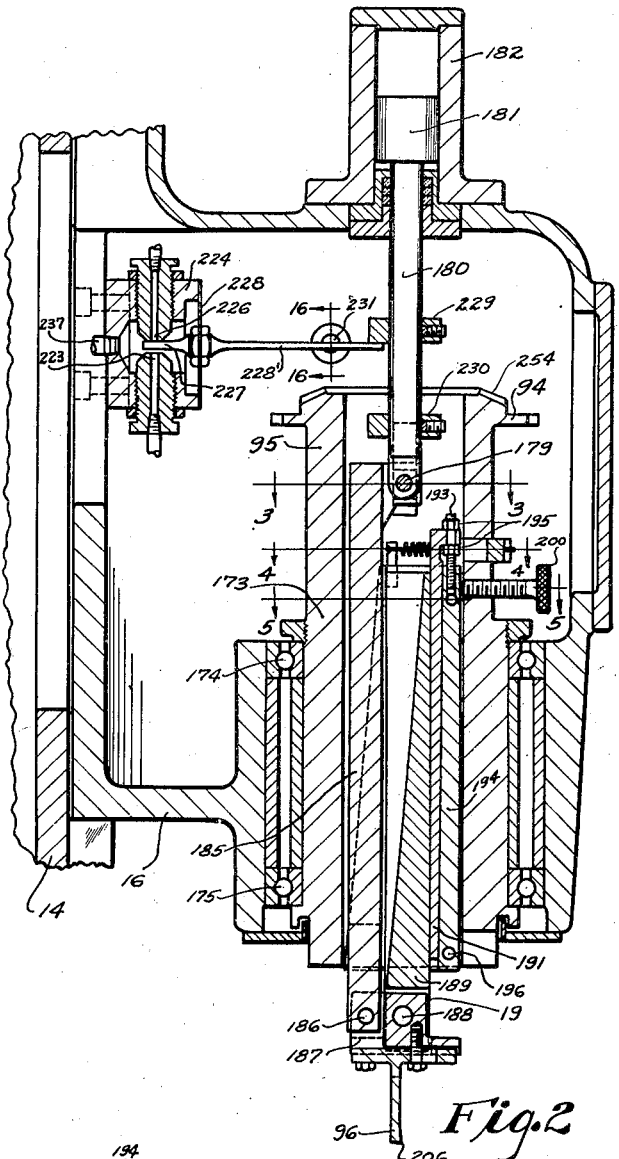
Figure 2 is a vertical section taken on the line 2—2 of Figure 1.
Figure 4:
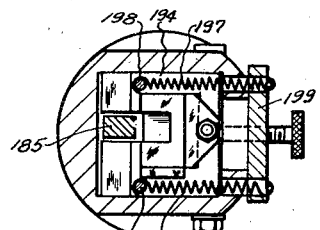
Figure 5:
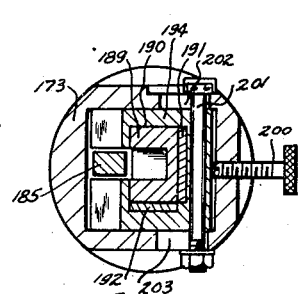

Figures 3, 4, and 5 are detail sections taken on the lines 3—3, 4—4, and 5—5 respectively of Figure 2.

Figure 6:
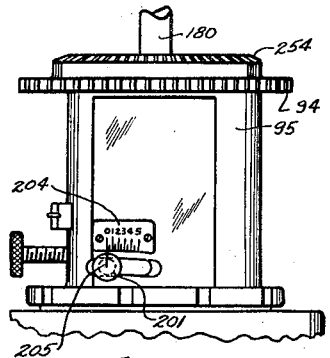

Figure 6 is a detail view of the upper portion of the rotatable head which supports the shaping tool, showing the adjustable means for varying the angularity of the path of the shaping tool with respect to the work support.

Figures 1, 17:
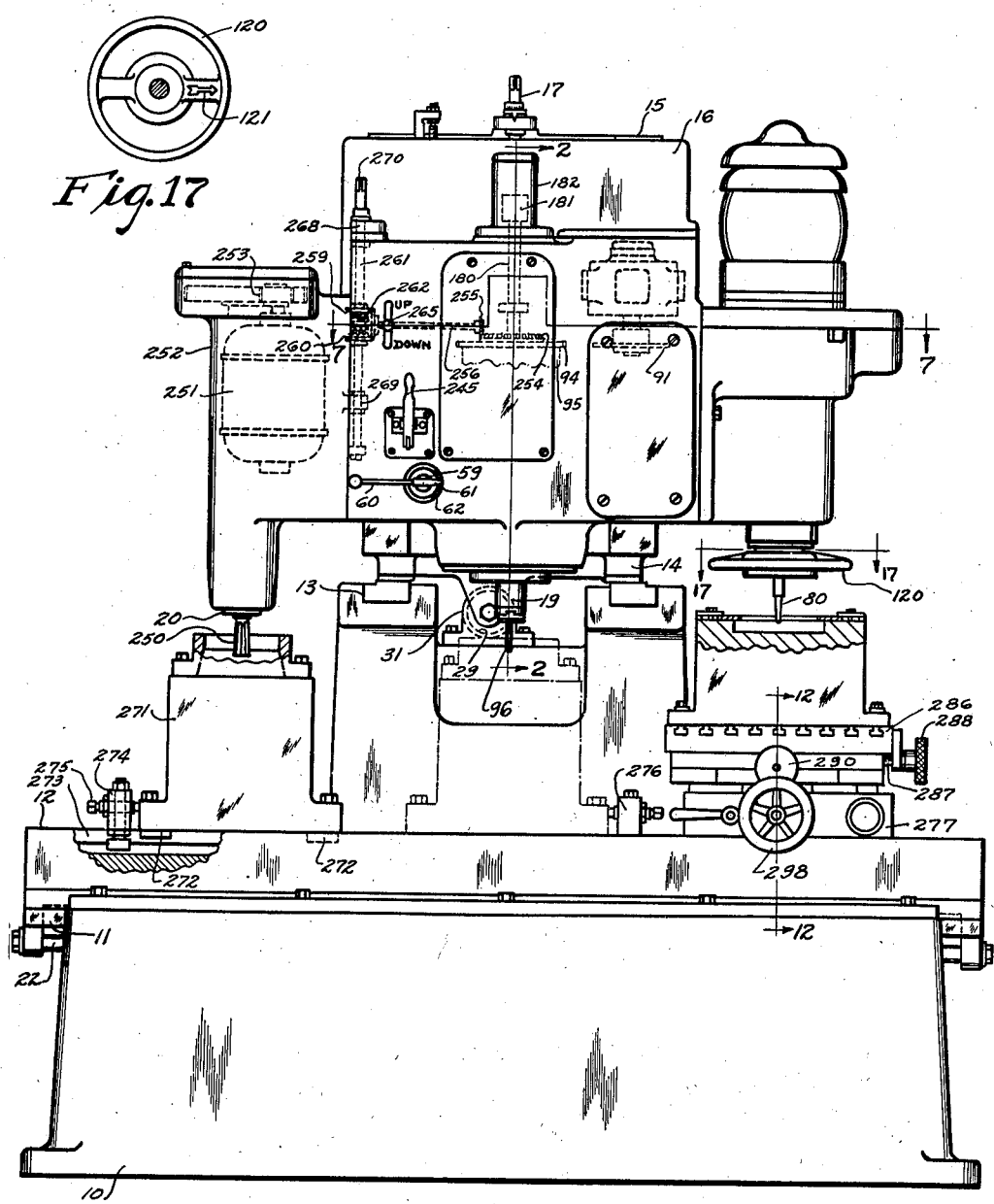
Figure 1 is a front elevation of a machine embodying the principles of this invention.

Figure 7 is a sectional view taken on the line 7—7 of Figure 1.

Figures 8, 9, 10, and 11 are diagrammatic views showing the various positions of the shaping tool when cutting a square corner.

Figure 12 is a sectional view on the line 12—12 of Figure 1.

Figure 13 is a sectional view on the line 13—13 of Figure 12.

Figure 14 is a detailed section on line 14—14 of Figure 13.

Figure 15:
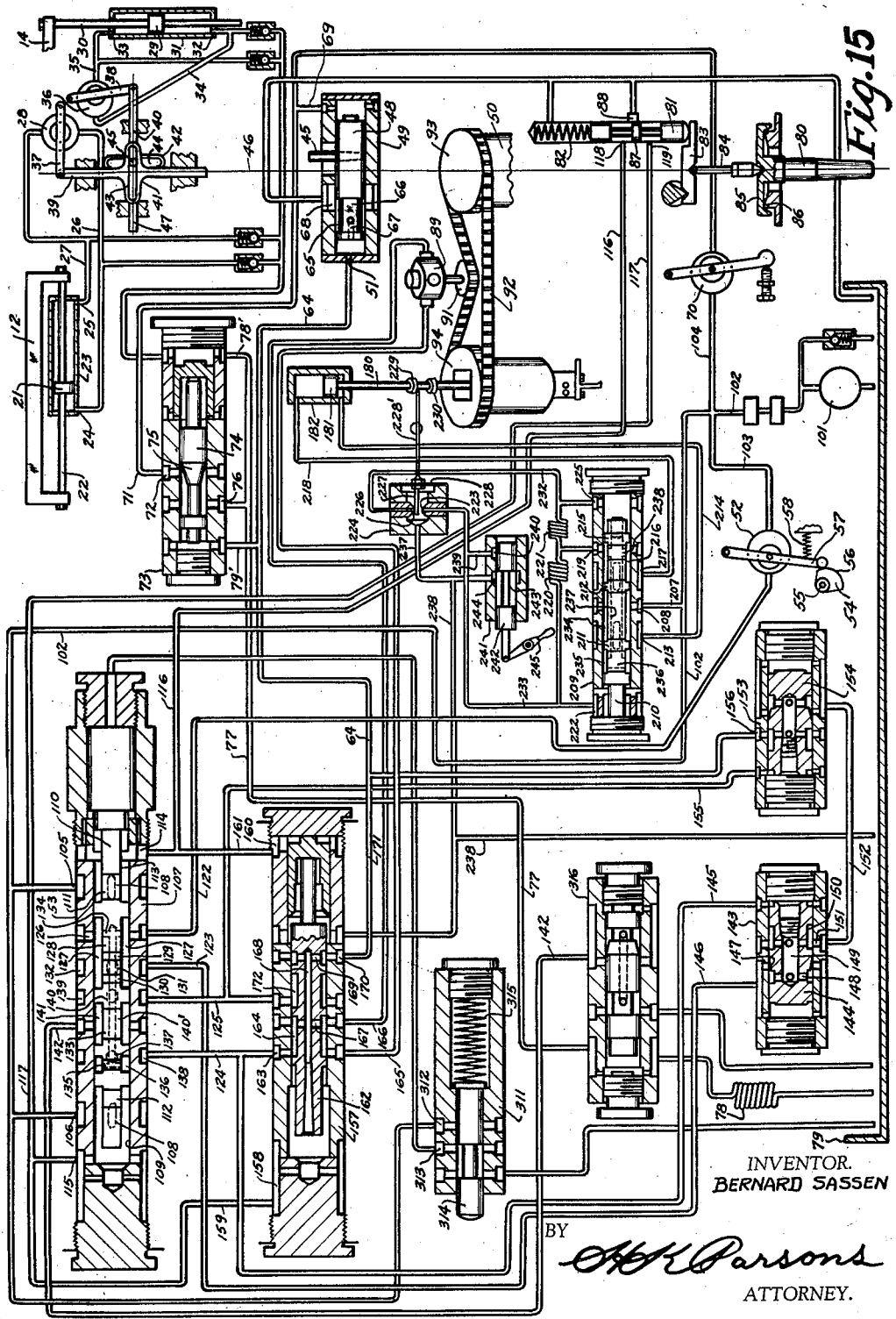

Figure 15 is a diagrammatic view of the hydraulic control circuit of the machine.

Figure 16:
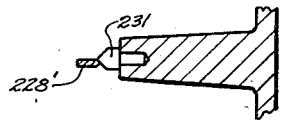

Figure 16 is a detail section on the line 16—16 of Figure 2.

Figure 17 is a detail view on the line 17—17 of Figure 1.

In the machine shown in Figure 1 the reference numeral 10 indicates the bed of the machine upon which is formed a first pair of guide ways 11 for receiving and guiding a work supporting platen or table 12; and a second pair of guide ways 13 for receiving and guiding a second slide 14 which is movable in a direction transversely to the direction of movement of table 12. The slide or ram 14 has vertical guide surfaces 15 formed on the forward end thereof for receiving a vertically adjustable carrier 16. This vertical adjustment may be effected by a conventional screw 17 fixed in the upper end of the slide and passing through a nut 18 which is fixed with the ram 14.

The slide 16 is adapted to carry a reciprocable tool carrier or slide 19 and a rotatable tool carrier or spindle 20. These tools are adapted to be selectively utilized for machining work carried by the table; and the necessary relative feeding movement therebetween, as distinguished from adjusting movements, is effected by individually or simultaneously moving the slides 12 and 14. The machine is designed, however, for pattern controlling this feeding movement and therefore the power operable means for these two slides are interconnected for common control and it is only through this common control that these slides may be moved individually and by power, there being no separate means provided for manually adjusting the respective slides. The means for pattern controlling the relative feeding movements of the two slides and determining the direction of generation of the cutting path will now be described.

Referring to Figure 15, the slide 12 is moved by a piston 21 connected by a piston rod 22 to opposite ends of the slide, the piston being contained in a cylinder 23 having a pair of ports 24 and 25 connected respectively by channels 26 and 27 to the ports of a reversible variable delivery pump 28. Similarly, the slide 14 is moved by a piston 29 connected by piston rod 30 to the slide and contained in a cylinder 31 having a pair of ports 32 and 33 which are connected respectively by channels 34 and 35 to a second reversible variable delivery pump 36. The pumps 28 and 36 have control pendulums 37 and 38 respectively which are connected to shifter rods 39 and 40 which are supported for axial movement in right angular paths. Each shifter rod has an intermediate yoke 41 and 42 respectively having slots 43 and 44 respectively which also extend at right angles to one another. A control pin 45 extends through the slots in these yokes and when the pin is at the intersection of axes 46 and 47 the volumetric displacement of both pumps 28 and 36 is zero.

As pin 45 is moved to the right or left of axis 46 it increases the displacement of pump 36 so as to increase the flow in either channel 34 or 35, depending upon the direction of movement of pendulum 38 and thereby cause movement of piston 29 and slide 14 in one direction or the other and without causing any movement of the slide 12.

Similarly, if the pin 45 is moved along axis 46 in either direction from its central position it will vary the displacement of pump 28 through pendulum 37 and thereby cause fluid pressure to flow through channel 26 or 27 and impart opposite directions of movement to the slide 12.

It will also be obvious that if the pin 45 is moved radially in any of the four quadrants formed by the intersection of axes 46 and 47 that both pumps will function to cause simultaneous movement of both slides and in predetermined relation to cause a resultant relative movement in the same radial direction that the pin is moved from its center position. Furthermore, if the pin is radially displaced from its center position and then moved in a circumambulatory path about that center the same resultant relative movement will be imparted to the slides.

The pin 45 is actually supported in the piston 48, slideably mounted in a cylinder 49, and fluid pressure means is utilized for displacing the piston 48 and the pin 45 with respect to the axis 46. This fluid pressure means is only utilized for displacing the pin 45 radially, the circumferential movement of the pin being obtained by mounting the cylinder 49 for rotation with the tracer head 50. From this it should be obvious that when the tracer head 50 is rotated, a change in direction is accomplished and that when the tracer head is stationary a radial movement of the pin will change the rate of feed, because although the pin varies the displacement of the two pumps still it changes those rates of displacement in the same proportion so that the direction of movement is not changed, which makes it possible to increase or decrease the feed rate without changing direction. The position of the pin 45 is ultimately determined by changing the quantity of flow to the port 51 of cylinder 49. This volume of flow may be changed by two different means. First, it may be changed by varying the displacement of the feed rate supply pump 52, and second, by the secondary valve 53 which is connected in series between the pump 52 and the port 51 in a manner to be explained more fully hereafter. The distinction between these two controls is that the setting of the pump 52 will determine the maximum movement of the piston 48 and the secondary valve will determine intermediate displacement between this maximum displacement and zero displacement which will correspond to the position when the pin 45 is co-axial with the axis 46. The displacement of pump 52 is controlled manually by a suitably formed cam 54 fixed to a rotatable shaft 55, the cam having a suitably contoured surface 56 which operatively engages the pendulum 57 and restrains the movement thereof by a spring 58. In other words, as the cam 54 is rotated in a counterclockwise direction, as viewed in Figure 15, the displacement of the pump will gradually be reduced to zero.

The shaft 55 is operatively connected to a shaft 59 mounted on the front of the machine, as shown in Figure 1, and has a control lever 60 which may be termed the feed rate control lever. This lever may have an integral pointer 61 which moves over a graduated dial 62 for indicating the feed rate setting.

The manner in which the position of the plunger 48 is changed by a change in the volumetric flow to port 51 will now be explained. In spite of the fact that the volume in the supply line 64 may be varied by the means previously described, nevertheless for purposes of description it may be assumed to be instantaneously constant. The fluid entering port 51 acts on the left end of plunger 48 and upon the full end area thereof to exert an urge toward the right and thereby radially shift the pendulum pin 45. The pressure of this fluid, however, depends upon the resistance to escape of fluid to reservoir and therefore a variable resistance has been provided and the value of this resistance will determine the unit pressure acting on the left end of the plunger. This resistance is formed by slightly reducing the diameter of the valve 65 to form an annular groove, and then flattening opposite sides of the annular groove as at 66 and connecting the space between these flattened sides and the inside cylinder wall by an internal passage 67 with the end of the cylinder so that fluid entering the port 51 will pass through the passage 67, entering the enlarged space formed between opposite sides of the plunger and the cylinder wall, and then escape through the considerably narrower space between the portions 65 to the port 68.

As the plunger 48 is moved longitudinally, more and and more of the surface 65 is exposed to the port, thereby lowering the value of the resistance and lowering the pressure in the line 64. Since the pin 45 moves the pump pendulums there is a reaction from the pump pendulums tending to shift the plunger 48 toward the left and create opposition to shifting of the plunger toward the right. The right hand end of cylinder 49 is connected to a fluid supply line 69, which pressure can be varied to act in opposition to the pressure in supply line 64. The line 69 is supplied with fluid from a constant delivery pump 70 and this line also has a branch 71 leading to port 72 of a differential valve 73. This valve has a plunger 74 upon which is formed a tapered portion 75 which is movable with respect to port 72 to restrict or enlarge the opening of said port and thereby change the pressure in line 71, and consequently the pressure acting on the right end of plunger 48.

The valve 73 has an exhaust port 76 through which the fluid from port 72 escapes and the port 76 is connected by a channel 77 to a resistance 78, which has a fixed value and therefore will create a fixed pressure at the port 76. The outlet from the fixed resistance carries the oil back to a common reservoir 79. From this it will be seen that since the pressure at port 76 is constant and the pressure at port 72 may be varied, there will be different values to the drop in pressure across the resistance represented by the throttle 75 of port 72.

The channel 77 has a branch 78' which connects to the right hand end of valve 73 and the channel 64 has a branch 79' which connects to the left hand end of the valve, and since the projected areas are different, the valve becomes in effect a differential valve. The result of this is that when the flow in line 64 is increased, for instance, the pressure will naturally momentarily rise in the line 64 because the resistance 65 has not changed in value. This rise in pressure produces two results—first, assuming that the plunger 48 is in equilibrium it will cause shifting of plunger 48 toward the right; and second, assuming the plunger 74 in equilibrium, the rise in pressure in channel 79' will cause shifting of plunger 74 toward the right. The effect of this is to reduce the resistance at port 72, and thereby in channel 71, which will lower the pressure on the right end of plunger 48 and further assist in movement thereof. In other words, the pressure on one end has increased and the pressure on the other end has momentarily decreased, which thereby provides a larger pressure differential which suddenly becomes effective to shift the pin 45. This shifting movement, however, will reduce the value of the fluid resistance 65 and thereby cause a lowering in the value of the pressure in line 64. The lowering of this pressure will be communicated through channel 79' to the left hand end of plunger 74 and since the pressure on the other end of this plunger is always constant, the plunger will return again toward the left a sufficient amount to build up the pressure again in line 71, and oppose further movement of plunger 48 and the parts will be in equilibrium again.

The tracer 80, which is adapted to engage the pattern, is operatively connected in such a manner as to control the rotation of the tracer head and the radial movement of pin 45. This tracer head may be of any known conventional structure which is operative in such a manner as to cause axial movement of a primary control valve 81 whenever the tracer is deflected. The primary control valve must, however, have a normal central position during operation of the machine so that it is free to move in either one direction or the other, depending upon whether the tracer engages an eminence or a depression in the surface of the pattern. In Figure 15 the parts are shown with the tracer out of engagement with any pattern so that the spring 82 has acted to shift the plunger 81 downward and thereby through the pivotal lever 83 exert an axial thrust on the intermediate pin 84 and hold the flange 85 on the upper part of the tracer button in contact with the fixed raised annular surface 86. It will be noted that the annular surface 86 is concave to form a sharp edge which interfits a corner formed by turning down the periphery of the flange 85. When the tracer button 80 engages the pattern it deflects the tracer a predetermined amount to shift the valve 81 so that the spool 87 is central with respect to an exhaust port 88. This is called the normal working position and the pattern must deflect the tracer this amount in order that the tracer may then be responsive to move in either direction, that is, either back toward the normal position shown in Figure 15 or further deflected therefrom.

Use is made of this mechanism to control the position of the secondary valve 53 previously referred to, which valve in turn simultaneously determines the rate of volumetric flow to line 64 and also the rate of rotation of a fluid operable motor 89 which is operatively connected for rotation of the tracer head. This connection is more clearly shown in Figure 7, wherein the motor shaft 90 is shown with a sprocket wheel 91 keyed to the end thereof. A chain 92 passes over this sprocket wheel and around a sprocket wheel 93 integrally connected to the tracer head for rotation thereof and also over a second sprocket wheel 94 which is operatively connected for turning a head 95 in which is mounted a shaping tool 96. The motor 89 has a flange 97 by which it is supported on the surface 98 and this surface has slots 99 formed therein through which pass clamping bolts 100 for securing the motor in place. Since the slots are elongated, the motor may be adjusted laterally so that the sprocket wheel 91 may be adjusted to take up any slack in the chain drive.

The primary valve 81 controls the position of the secondary valve by what may be termed as hydraulic amplification means. A third pump 101 delivers fluid from the reservoir 79 to channel 102, which may have two branches 103 and 104 for supercharging pumps 52 and 70, and is connected to ports 105 and 106 of the secondary valve. These ports communicate with annular grooves formed in the valve sleeve 107 and these annular grooves have elongated radial holes 108 which communicate with the bore 109 formed in the sleeve. The valve plunger 110, which is slidably mounted in this bore has slightly reduced arcuate surfaces 111 and 112 formed thereon which are movable with respect to these radial holes to vary the resistance thereof and thereby the escape of fluid to the side chambers 113, which are formed by flattening the sides of the plunger 110. These side chambers communicate with a pair of ports 114 and 115 which are connected by channels 116 and 117 respectively to ports 118 and 119 of the primary valve 81. When the spool 87 is central of port 88 it will be apparent that there will be no escape of fluid from channels 116 and 117 and the pressures acting on opposite ends of plunger 110 will be equal, and if they are not equal the plunger 110 will shift in such a direction as to equalize the resistances at openings 108, thereby causing an equal pressure drop from ports 105 and 106 to channels 116 and 117. Therefore, the plunger 110 has a definite position, not only when the spool 87 is central with respect to port 88, but also when it is shifted with respect to that port for the reason that we have two parallel channels supplied from a common source and the pressures in those two channels are only equal when the resistance to fluid flow into the channel is equal to the resistance to fluid flow out of the channel, and therefore, when the spool 87 is shifted it changes the value of the resistances to fluid flow out of channels 116 and 117, which will cause such a change in pressure as to cause the valve plunger 110 to shift until the resistances at the respective ports 108 are in the same ratio to one another as the previously mentioned pair of resistances.

By these means it is possible to have the resistances at port 88 change sharply for small movements of the valve 81 and the resistances at openings 108 to change slowly so that the secondary valve may have greater movement than the valve 81. Thus a very small movement of the tracer may be utilized to effect a sufficiently large movement of the secondary valve to adequately control the flow to the devices connected thereto.

When the machine is started the tracer is out of contact with the pattern and the first requirement is to cause relative movement between the parts to establish a working engagement between the tracer and pattern. To this end the tracer head is provided with a hand wheel 120 by which the tracer head may be rotated to initially position the parts and primarily to position the valve 49 carried in the tracer head so as to determine the radial direction of movement of the pin 45 whereby when fluid pressure is applied to the circuit the pin 45 will move in a desired radial direction, causing the correct proportioning of pump displacements and thereby relative bodily movement between the tracer and pattern in a linear direction. To assist the operator, the hand wheel 120 is provided with an arrow 121, which arrow is so positioned that it will always lie in the radial plane of movement of pin 45.

Since the tracer is undeflected at this time the primary valve plunger 81 will be in the position shown in Figure 15, in which position the line 116 is connected to reservoir and the line 117 is completely disconnected from reservoir with the result that the pressure in line 116 will drop to close to atmospheric pressure and that in line 117 will rise. The result of this is that the pressure acting on the left hand end of the secondary valve plunger 110 will be greater than that acting on the right hand end and the valve will be shifted to the position shown in Figure 15.

The function of the secondary valve is to divide the quantity delivered to channel 122 by the pump 52 proportionately among the feed line 123 and the motor supply lines 124 and 125. The purpose of this is that when the surface being traced is substantially straight all flow will go to channel 123 and no flow will go to channels 124 and 125, but if the surface should curve then the flow to line 123 is reduced and the remaining quantity delivered to line 124 or 125 to cause rotation of motor 89, the direction of which will be determined by whether the flow is delivered to channel 124 or 125. The line 122 is connected to port 126 of the secondary valve from which it flows into the lateral spaces 127 formed by cutting away opposite sides of plunger 110. The intermediate portion 128 has arcuate grooves 129 and 130 ground therein, which are only a few thousandths of an inch deep. This intermediate portion is relatively movable with respect to elongated slots 131 formed in the valve sleeve above and below this intermediate portion, and these slots are interconnected by an annular groove 132 to which the feed line 123 is connected.

The fluid from channel 122 also flows through an axial bore 133 which is connected by a cross bore 134 to the space 127 and by the cross bore 135 to the lateral spaces 136 formed in the plunger 110. Intermediate these lateral spaces is a second reduced portion which is movable relative to elongated slots 137 which communicate with the annular grooves 138 to which line 124 is connected.

The channel 125 is connected to an annular groove 139 which has elongated slots 140 formed therein which are adapted to be alternately connected with arcuate grooves 130 or grooves 140', the grooves 140' communicating with annular spaces 141 which lead to the reservoir line 142.

The elongated slots 131, 137, and 140 and the respective arcuate grooves 129 and 130, 136 and 140', and 130 and 140' cooperating therewith constitute fluid resistances which determine the division of flow, but in order to maintain this division it is necessary to use balancing valves. To this end a first balancing valve 143 is provided which has a reciprocable plunger 144, and one end of the valve is connected by channel 145 to line 124 and the opposite end of the valve is connected by channel 146 to the feed line 123. When there is no flow in line 124 the pressure in line 123 will shift the valve plunger 144 to its right hand position as shown in Figure 15 and the oil will flow past the tapered spool 147 through the radial bore 148 and axial bore 149 to the annular groove 150, which at this time is connected to port 151 which is connected by channel 152 to a second balancing valve 153. If there should be such a division of flow that oil is delivered to channel 124 then the plunger 144 will shift in such a direction that the spool 147 creates a resistance to flow from line 146 until the pressure therein is equal to the pressure in line 124. So long as these pressures remain equal the division flow established by the secondary valve will be automatically maintained.

The balancing valve 153 also has a plunger 154 which is shiftable to balance the flow between line 123 and line 125 so that when the flow is in these two lines the balancing valve will automatically maintain equal pressures therein. This is accomplished by connecting the left end of valve 153 by channel 155 to channel 125. It will thus be seen that the feed line flows serially through the two balancing valves and that one balancing valve is connected to line 124 and the other to line 125 so that regardless of which of these channels is receiving flow from the secondary valve the same will be balanced against the flow in the feed line 123. The port 156 of balancing valve 153 is connected to the line 64, previously referred to, the pressure in which determines the position of the pendulum control pin 45.

When the machine is started the tracer is out of contact with the work, which means that the secondary valve plunger 110 is in the position shown in Figure 15 and the fluid delivered thereto from channel 122 is practically all delivered to channel 124. This normally would cause rotation of motor 89 and the connected tracer head and the tracer would probably never be moved into contact with the work. For this reason an automatic engagement control valve 157 is provided for diverting the flow from channel 124 into the feed line 64 until the tracer contacts the work and shifts the secondary valve plunger 110. To this end the valve 157 has a port 158 at one end, which is connected by channel 159 to channel 117; and a second port 160 which is connected by a branch 161 to line 116 whereby the pressures in lines 116 and 117, as determined by the tracer primary valve plunger 81 is communicated to opposite ends of the valve plunger 162. Since the pressure in line 117 at this time is the greater, the valve plunger 162 will be shifted to the right. This will interconnect port 163 by means of the annular groove 164 in plunger 162 to channels 165 and 166 which lead to the motor 89 and since the pressure in both of these last-named channels is equal no rotation of motor 89 will occur. The annular groove 164 is connected by a cross bore 167 to an axial bore 168 which terminates in a second cross bore 169 leading to port 170. This last-named port is connected by a branch line 171 to the feed line 64 so that the fluid from line 124 finally finds it way into line 64 to cause a feeding rate and no rotation of motor 89. Thus a relative translation between the tracer and pattern will be effected and the tracer will be moved into engagement with the pattern.

When the tracer engages the pattern the primary valve 81 is moved axially and when it reaches a position central of port 88 the pressure in lines 116 and 117 will be equalized. The spool 87 is slightly smaller in width than the opening of port 88 so that some flow from both lines to reservoir will take place. This equalization of pressure in the two lines will cause the secondary valve to shift to a substantially central position and also cause the engagement control valve plunger to shift to the left due to the fact that the area of the right hand end of the piston is greater than the area of the left hand end. As a matter of fact the engaging valve will shift earlier than the secondary valve, thereby disconnecting port 163 from line 166 so that all fluid delivered to line 124 will go to line 165 and thereby momentarily cause rotation of the tracer head. Line 125 will be connected to motor channel 166 by the annular groove 172. The engagement valve thus serves to short circuit the tracer head motor until the tracer 80 has engaged the pattern.

When the tracer is in working engagement with the pattern it is deflected at such a predetermined angle that the spool 87 of the tracer controlled valve 81 is substantially central of port 88, thereby maintaining the secondary valve in a substantially central longitudinal position. This means that the flow from pump 52 passing through channel 122 is practically all delivered to channel 123 from which it passes through the two balancing valves to line 64 and to the control valve 49 to control the radial position of pin 45 and thereby the rate of feed movement.

The flow from channel 122 will also pass through the longitudinal bore 133 of the secondary valve plunger 110 to the annular groove 136 whereby if the plunger 110 shifts toward the right the pressure fluid will pass through port 137 into motor channel 124, or if the valve is shifted toward the left the pressure in annular groove 127 will pass through port 139 into the motor channel 125. Thus any abnormal shifting of the tracer from its normal operating position will cause flow in channel 124 or 125 and thereby through the interconnecting lines cause rotation of motor 89 in a clockwise or counter-clockwise direction.

Blanking dies, which this machine is especially capable of machining, may come to the machine with an opening preformed therein, such as a rough casting, or they may be in the form of a solid plate. In the first instance, only a small amount of stock has to be removed to enlarge the opening to proper size and contour. For this purpose, a shaping tool has been provided which is supported on a rotatable head the same as the tracer for slow rotary movement during its progress around the periphery of the hole being formed and the shaping tool is constantly reciprocated during this slow travel or feeding movement. The mechanism for supporting and rotating the tool is more particularly shown in Figure 2. The head 173 is supported for rotary movement on anti-friction bearings 174 and 175 and has an integral sprocket wheel 94 formed near the upper end thereof which is connected by means of the chain 92 with the sprocket wheel 91 formed in the end of the motor shaft of the hydraulic motor 89.

As shown in Figure 3 the head 173 has a squared hole 176 and the upper portion of the head has flattened sides 177 and 178 in which is rotatably and slidably supported a pin 179. This pin is connected by piston rod 180 to a piston 181 reciprocably mounted in cylinder 182 and reciprocation of this piston effects vertical reciprocation of the shaping tool 96 through the mechanism to be described hereafter. The pin 179 also passes through a pair of ears 183 and 184 which project laterally from the top of connecting link 185. The lower end of this link is connected by a pin 186 to the pivoted head 187 which is supported by a second pin 188 in the end of a reciprocable slide 189. The slide 189 moves up and down in a squared hole 190 and a proper fit is maintained by a pair of gibs 191 and 192 which engage right angular sides of the slide 189 to insure a proper fit in two directions.

As shown in Figure 2, the gib 191 has a screw 193 which passes freely through the end of the gib but is threaded in the adjustable guide supporting member 194 which contains the square hole 190. A pair of lock nuts 195 serves to hold the gib in various adjusted positions.

The member 194 is pivotally mounted at its lower right hand corner on a pin 196, which pin is carried by the head 173 and is movable therewith. The purpose of pivotally supporting the guide member 194 is to change the angular relation of the guide hole 190 with respect to a vertical, whereby the walls of the die may be given a predetermined amount of undercut, as it is conventional practice in blanking dies to provide a small amount of clearance in the dies so that the work after being blanked will pass freely on through. A pair of springs 197 connected at one end to pins 198 fixed in the member 194 and at the other end to a cross bar 199, which abuts the side of the head 173, serve to normally urge the guide member 194 toward a vertical position.

A threaded set screw 200 serves to limit this movement and may be rotated to vary the angularity thereof. As shown in Figure 5 a clamping bolt 201 is passed through the member 194 and through the side walls of the head 173 for the purpose of clamping the guide member in various adjusted positions. To permit this adjustment the holes 202 and 203 are slotted, and, as noted in Figure 6, a suitable graduated scale 204 may be mounted adjacent one of these holes for cooperation with a mark 205 carried on the end of the bolt 201, to indicate in degrees the angularity of the vertical guide member.

When pressure is admitted to the upper end of cylinder 182 the link 185 is moved downward and since the head 187 is pivoted on pin 188, the tool head will be rotated counter a slight amount to position the cutting edge 206 in a cutting position during downward movement of the slide; and upon upward movement of the piston 181 the head 187 will be rotated clockwise to retract the edge 206 from the work to prevent rubbing or scraping thereon. This acts in effect like the well-known clapper box on a shaping or planing machine.

The fluid for effecting reciprocation of the shaping tool comes from pump 101 through a branch line 207 of channel 102 which delivers it to port 208 of a reversing valve 209. The plunger 210 of this valve has a pair of spools 211 and 212 which are suitably spaced so that when the plunger is shifted to the left, pressure port 208 is connected to port 213, and thereby, through channel 214, to the lower end of cylinder 182.

The plunger 210 has an additional spool 215 which is spaced from the spool 212 to form a cannelure 216 which is adapted to connect port 217 which receives the return flow from the upper end of cylinder 182 through channel 218 to a return port 219. The fluid escaping from port 219 is divided and flows through two fluid resistances 220 and 221 and the outlet of resistance 220 is connected to port 222, which is at the left hand end of valve housing 209, and to port 223 of pilot valve 224. Similarly, the outlet of resistance 221 is connected to port 225 at the right hand end of valve housing 209 and to port 226 of pilot valve 224.

Ports 223 and 226 are alternately closed by the valve stem 227 which is supported by a thin diaphragm 228 on the body of the valve 224. This stem has a projection 228' which terminates adjacent the piston rod 180 for alternate actuation by adjustable dogs 229 and 230 carried by the piston rod. The diaphragm 228 normally acts to hold the valve member 227 intermediate ports 223 and 226 whereby neither port is closed. A detent 231, Figure 16, is therefore provided for holding the valve member 227 in port closing positions as the same is moved thereto by dogs 229 and 230.

The manner in which the pilot valve effects power operation of the reversing valve may be explained as follows.

The fluid returning from cylinder 182 through port 219 passes through two resistances 220 and 221. From Figure 15 it will be noted that channel 232, which connects the outlet of resistance 221 to port 226 is blocked due to the fact that port 226 is closed by the valve member 227. Therefore, if the returning fluid continues to flow into channel 232 the pressure therein will rise and this pressure will be communicated through port 225 to act on the right end of plunger 210.

On the other hand, the outlet of resistance 220 which is connected by channel 233 to port 223 is not blocked due to the fact that port 223 is open, and since no pressure can build up in channel 233 there will be a drop in pressure across the resistance 220 and this lower pressure will be communicated through port 222 to the left end of plunger 210. We, therefore, have a condition in which the pressure acting on the right end of plunger 210 is greater than the pressure acting on the left end and the plunger is automatically shifted toward the left.

Since pressure fluid is now being delivered to the lower end of cylinder 182 the piston 180 will move upward until dog 230 throws the valve stem 228' to the other side closing port 223, which will now cause a rise in pressure at port 222 and the lowering in pressure at port 225, thereby shifting the valve plunger 210 to the right. The cannelure 234 between spools 211 and 212 will now connect the pressure port 207 to port 217 and pressure fluid will flow to the upper end of cylinder 182. The fluid returning from the lower end of the cylinder through port 213 will flow through the cannelure 235, cross bore 236, longitudinal bore 237 and cross bore 238 into the cannelure 216, all of valve plunger 210, and again to port 219. Thus, the port 219 receives the returning fluid from either end of the cylinder to supply operating pressure to the pilot control circuit.

The fluid escaping through either port 223 or 226 of the pilot valve is connected in return through channel 237 which is permanently connected to a common return line 238. Channel 233, which leads to pilot valve port 223 has a branch 239 leading to port 240 of a stop valve 241. This valve has a manually shiftable plunger 242 in which is formed a cannelure 243 which is operable when the plunger is shifted to the right to connect port 240 to port 244, which port is also connected to the common return line 238.

The effect of this is that when the piston 180 moves upward and closes port 223 and the stop valve piston 242 is shifted toward the right, no pressure will build up in line 233 due to the fact that it is connected to an open reservoir line. The result is that the valve plunger 210 will remain in its previous position, causing deliverance of fluid to the lower end of cylinder 182, and after completion of the upward stroke will hold the piston 181 in a raised or elevated position. Therefore, when the reciprocating motion is stopped it will always stop with the tool in an elevated position.

From the foregoing it will now be seen that when the operator shifts the manual control lever 60 at the front of the machine to adjust the displacement of pump 52, Figure 15, and fluid is delivered into the tracer control circuit that a relative movement will take place between the tracer and pattern and between the tool and the work along a rectilinear path until the tracer contacts the pattern, and assuming that the operator has shifted the stop valve to the running position shown in Figure 15 by means of the manual control lever 245, which is also mounted on the front of slide 14, that the shaping tool 96 will commence to machine.

After the parts have relatively moved a sufficient amount to deflect the tracer to its normal working position, fluid will be delivered to the rotary motor 89 and start rotation of the head at proper times so that the work and pattern are moved in an orbital path about the cutter and tracer.

The shaping tool is so shaped and designed that the corner 246, as shown in Figure 8, actually does most of the cutting and the sides 247 and 248 are at such an angle to the cutting face 249 as to provide proper clearance during rotation of the head so that square corners may be formed in the work without interference.

In Figures 8, 9, 10, and 11, in which figures the end of the tool is shown greatly enlarged, there are depicted the various positions that the end of the tool takes as it forms a square corner.

As previously mentioned, the blank stock out of which dies are to be formed may come to the machine without any preformed hole in it, and to take care of such situations the slide 16 is also provided with a rotatable spindle 20, as previously mentioned, in which may be secured a suitable tool such as a drill or a milling cutter, depending upon the manner in which an opening is to be formed in the blank stock. One way of accomplishing this is to place an end mill, such as 250, in the spindle 20. This spindle may be driven by a prime mover 251 carried by the slideable head 252 which supports the spindle and may be connected thereto through suitable reduction gearing, indicated generally by the reference numeral 253.

When an end mill is used, the material may be removed by a trepanning operation, in which case relative movement between the tool and work is effected as previously described except that the work makes a series of orbital movements about the cutter and the cutter is gradually fed downward during these movements until it finally cuts through the material. This downward feed is effected automatically, and the mechanism for accomplishing it is shown more particularly in Figures 1 and 7. The sleeve 95 that holds the shaping tool has a beveled gear 254 formed on the top thereof which intermeshes with a beveled gear 255 secured to the end of shaft 256 journaled in a fixed part 257 of the slide 16. The other end of the shaft has a beveled gear 258 which meshes with a pair of bevel gears 259 and 260, constituting a reversing mechanism.

This reversing mechanism is of conventional type and the gears 259 and 260 are mounted for free rotation relative to the feed screw 261 and have clutch teeth on opposing faces which are selectively engageable by the shiftable clutch member 262, which is splined on the lead screw. The clutch is shifted by a shifter fork 263 formed on the end of the pivoted lever 264 which has a manually operable handle 265 projecting through the front wall of the machine. A spring pressed detent 266 cooperates with the series of indents 267 formed in lever 264 to hold the clutch in any one of three positions, one of which causes upward feed; the second of which causes downward feed; and the third of which is a neutral position. The screw 261 is supported against longitudinal movement in a bracket 268 attached to slide 16 and is threaded through a nut 269 carried by the slide 252. The upper end of the screw has a squared end 270 by which the screw may be manually rotated.

If it is desired to remove the center material by first drilling a hole through the work the elevating screw may be manually rotated to feed the drill downward which may be done independently of the rest of the machine and while the hydraulic circuit is inactive. The drill may then be removed and a suitable milling cutter substituted therefor and the hydraulic profiling circuit utilized for guiding the milling cutter in a pattern controlled path and thereby complete the trepanning operation in one relative orbital movement between the cutter and the work.

If it is desired to rough out the opening in the die by use of the milling cutter and then finish the opening to desired size and contour by the shaping tool the work may be mounted in a suitable fixture such as 271, which has a pair a of depending lugs 272 adapted to properly fit in a T slot 273 formed in the top of the table, the sides of the T slot serving as guiding means for shifting the fixture longitudinally of the table 12. In such a case a stop block 274 may be clamped in the T slot with an adjustable set screw 275 for locating the fixture when shifted to the left, and a second stop 276 provided for locating the fixture when shifted to the right and properly positioning the work with respect to the shaping tool.

In Figures 12, 13, and 14 is shown a support for a pattern. This comprises a base 277 which has a circular depending sleeve 278 which is passed through a hole 279 formed in the table 12. This support is secured to the top of the table against rotation by a plurality of T bolts 280 as more particularly shown in Figure 13. A tubular member 281 is vertically movable within the sleeve and has an enlarged head 282 in which is formed guide ways 283 for receiving a saddle 284, the saddle having guide ways 285 formed in the top thereof and at right angles to the guide ways on the bottom for receiving the pattern support 286. The support 286 is longitudinally adjustable by means of a screw 287 rotatable by the knurled hand wheel 288, and the saddle is moved by screw 289 rotatable by the knurled hand wheel 290. Thus the pattern may be moved in two directions at right angles relative to the tracer.

The support 282 may be raised or lowered by an elevating screw 291 threaded through a nut 292 which is fixed with the tubular member 281. The screw is held against longitudinal movement by anti-friction bearings 293 which are fixed with the sleeve 278. The upper end of the screw has a beveled gear 294 meshing with a beveled gear 295, the latter being secured to the end of shaft 296 which projects through a boss 297 and is provided with an operating hand wheel 298. If so desired, a graduated dial 299 may be secured to the shaft for cooperation with a suitably fixed mark caried by the boss for indicating the amount of vertical movement of the pattern support.

In order to prevent inadvertent rotative movement of the pattern support during elevation thereof due to the fact that it is supported by a tubular member in the sleeve 278, a spring 300 is provided which has one end connected to a pin 301, which is fixed in the member 277, and the other end to a pin 302 which depends from the underside of the head 282. The spring tends to rotate the head 282 in a clockwise direction as viewed in Figure 13. In order to prevent this movement, however, a second pin 303 depends from the underside of member 282 and is provided with a reduced portion 304 for receiving a hardened ground sleeve 305 which is very accurately ground to produce a straight surface. This sleeve abuts the end of an adjustable plunger 306 mounted in the support 277. In order to prevent line contact the side 307 of sleeve 305 may be flattened off to provide a larger wearing surface.

The support 277 may have a slot 308 cut therein which interconnects the bore 309 to provide flexible portions whereby a clamping bolt 310 threaded in one of the flexible portions will serve to clamp the parts for vertical adjustment of the pattern support.

The object of this vertical adjustment for the pattern support is to provide an adjustment between the pattern and tracer and to utilize a tapered tracer button so that the opening in the die may be cut smaller than the opening in the pattern for roughing out purposes. For instance, if the pattern support is elevated to its highest position and a tapered tracing button is used and the diameter at the cross section is less than the diameter of the cutting edge of the tool, the hole in the die will be cut small. After roughing out the hole the pattern may be lowered relative to the tracer and a second or finishing cut may be made which will finish the hole to the exact size of the pattern. If additional clearance is desired, the pattern may be lowered still further.

In conclusion, attention is invited to the fact that a disengaging valve 311 has been provided which has a port 312, which is connectible to port 313 upon depression of the valve plunger 314 against the resistance of spring 315 to connect the pressure from pump 101 to the right hand end of the secondary valve to shift the plunger 110 thereof to an extreme left position and thereby entirely disconnect the feed line and cause delivery of all of the fluid to the rotary motor 89, whereby the tracer head 50 and tool head 95 may be rotated without any relative bodily movement between the work and tool taking place, so that the tracer and cutter may be disengaged from the pattern and work respectively.

Attention is also invited to the fact that a relief valve 316 may be inserted in line 142 to maintain a predetermined back pressure in the exhaust line from motor 89.

Briefly, the cycle of operation of shaping a die consists in mounting a plate having a preformed hole in it on the work holder 271, and mounting the pattern to be copied on the support 286. The holder 271 will be positioned and clamped against the stop 276. By means of the adjusting screw 17 the slide 16 may be moved down to enter the tool 96 and the tracer 80 into openings in the plate and pattern respectively. Reciprocation of the shaping tool may be started by shifting lever 245. The feed control lever 60 is now moved to cause relative movement between the table 12 and the slide 14, the resultant direction of which will be indicated by the arrow 121. This movement will be a rectilinear movement because the tracer is undeflected; the secondary valve is in its extreme right hand position; and the automatic engagement control valve 157 is in a position to divert all of the fluid to the feed line.

This movement will continue until the tracer engages the pattern and is deflected, which deflection will result in the automatic engagement control valve being shifted to stop the feed movement and divert the fluid to the rotary motor 89, which, through the chain 92, rotates the tracer head and tool head. This rotation will result in rotation of the hand wheel 120 and the arrow 121 will be moved until it assumes a position parallel to a tangent at the point of contact between the tracer and pattern. The tracer will automatically maintain this relationship through the power control means described, and since the direction of feed is always parallel to the direction in which the arrow points, it will be apparent that the entire outline of the pattern will be followed and a corresponding outline produced in the work by the shaping tool.

After completion of the shaping operation, the button 314 is depressed to cause separation of the tool and tracer from the work and pattern respectively, after which the machine may be stopped and the slide 16 elevated to permit removal of the parts.

There has thus been provided an improved machine tool for the purposes intended which may be utilized for forming blanking dies by either a shaping or milling method.

I claim:

1. A machine for producing blanking dies from blank stock comprising a pair of relatively movable supports, means to mount a piece of blank stock and a pattern on one of said supports, a roughing and a finishing tool mounted on the other support for selective engagement with the stock, said other support having a tracer for engagement with the pattern and power operable means controlled by the tracer while in engagement with the pattern to cause a prescribed path of relative movement between the tool and work.

2. In a pattern controlled machine tool the combination of a pair of relatively movable supports, means to support a tool and a work piece upon the respective supports for relative movement to perform a metal working operation, a pattern mounted on one of said supports, and a cooperating tracer mounted on the other support with its axis perpendicular to the plane of the pattern, power operable means controlled by the tracer while in engagement with the pattern to control the direction of relative movement between the tool and work to produce a contour in similitude to the pattern, said tracer having tapered sides, and means to effect relative movement between the pattern and tracer in a direction parallel to the tracer axis to vary the ratio of similitude between the work and pattern.

3. In a machine tool the combination of a first support, means for supporting a platelike blank by its marginal surfaces on said support, a second support, automatic pattern controlled trepanning means carried by said second support for producing an opening in said blank, and additional means operatively connected to said automatic pattern controlled means for control thereby to finish said opening to a prescribed size and contour.

4. In a machine tool for producing a contoured opening in platelike blanking dies, the combination of a pattern controlled mechanism, trepanning means for cutting an opening in the plate, shaping means for finishing said opening, and mechanism for coupling each of said means for power control by said pattern controlled mechanism.

5. In a pattern controlled machine tool, the combination of a first support, a reciprocable ram slidably mounted in said support and having a shaping tool attached thereto, fluid operable means for effecting a relatively rapid reciprocation of said ram, means to support a work piece in operative relation to said tool, and fluid operable pattern controlled means for effecting a relative translatory movement between the supports during reciprocation of said tool.

6. In a machine tool the combination of a first support having a reciprocable ram therein, a shaping tool attached to the end of the ram, a work receiving platen extending at right angles to the axis of reciprocation of the ram, means to support a work piece on said platen, pattern controlled power operable means for effecting a relative circumambulatory movement between the tool and work during reciprocation thereof, means to rotatably support the reciprocating ram, and means to effect rotation of said rotatable support in an opposite direction to the direction of said circumambulatory movement.

7. In a machine tool having a work receiving platen, a power operable ram mounted for reciprocation in a direction perpendicular to the plane of said platen, a support for said ram, a tool receiving slide pivotally connected to said ram and adjustable guides for said slide, and means to vary the angularity of said guides with respect to the axis of reciprocation of said ram whereby the tool will be moved by said ram through a path which is non-perpendicular to the platen.

8. In a machine tool the combination with a work support, of a second support having a first pair of guide ways therein perpendicular to the plane of the work support, a power operable ram reciprocably mounted in said guide ways, a second pair of guide ways mounted in said support in angular relation to said first set of guide ways, a tool slide reciprocably mounted in said angular guide ways, and means including a link connection between the ram and slide whereby the tool may be moved along a path which is non-perpendicular to the work support by said vertically reciprocating ram.

9. In a machine tool having a work support and a tool support, the combination of a reciprocable tool carrying ram, fluid operable means for reciprocating said ram at a rapid rate including a reversing valve, fluid operable means for shifting said valve including a pair of fluid channels connected respectively to opposite ends of said valve, said channels having extensions terminating in open ends, means to supply fluid to said channels, and means operable by the valve for alternately closing the open ends of said channels to create pressure therein for shifting said valve.

10. In a machine tool having a work support and a tool support, the combination of a reciprocable tool carrying ram, fluid operable means for reciprocating said ram at a rapid rate including a reversing valve, fluid operable means for shifting said valve including a pair of fluid channels connected respectively to opposite ends of said valve, said channels having extensions terminating in open ends, means to supply fluid to said channels, means operable by the valve for alternately closing the open ends of said channels to create pressure therein for shifting said valve, and means to by-pass one of said channels to reservoir whereby said reversing valve will not be shifted during movement of the ram in one direction and the ram will be stopped.

11. In a machine tool having a work table and a tool support the combination of a pair of metal working tools mounted in spaced relation on said tool support along an axis extending longitudinally of the table, T slots formed longitudinally in the top of the table, a work supporting fixture adapted to be mounted on the table having depending means adapted to interfit any one of said T slots whereby the fixture may be moved relative to said table and guided by said T slot during said movement, a first stop means secured to said table for limiting the movement of the fixture in one direction and aligning the same in a prescribed desired relation with the axis of one of said tools, a second stop means, and means for adjusting the same to limit the movement of the work fixture in the other direction and position the same in the same predetermined relation with the axis of the second tool that it bore to the axis of the first tool.

12. In a machine tool the combination of a work receiving platen, a ram mounted for reciprocation in an angular direction relative to the plane of said platen, a tool head pivotally supported on the end of said ram about an axis lying in a plane parallel to the plane of said platen, a fluid operable piston and a link operatively connecting said piston to the tool head at a point eccentric to the axis of said pivot whereby upon movement of the ram in one direction said tool head will be rocked to cause engagement of the tool with the work, and upon movement in either direction said head will be rocked to withdraw the tool from engagement with the work.

13. In a pattern controlled machine tool the combination of a work support, a ram movable relative to said work support and carrying a tracer and a cutter, power operable means controlled by the tracer for determining relative movement between the tool and work in any direction in a given plane and additional power operable means for effecting relative movement between the tool and work in a direction perpendicular to said given plane without disturbing the relation between the tracer and pattern.

14. In a pattern controlled machine tool the combination of a support for receiving a work piece and a pattern, a second support movable with respect to said first support and carrying a cutting tool and a tracer, means governed by the tracer while in contact with the pattern for determining relative movement between the tool and work in any direction in a given plane, and means to effect relative adjustment between the tracer and pattern in a direction perpendicular to said plane while maintaining the tool and work in their same operating planes.

15. A combined machine tool having a reciprocable work support, a ram mounted for movement in a direction transversely to the direction of table movement, a slide reciprocably mounted on the ram and carrying a plurality of different metal working tools for adjustment toward and from the work table, fluid operable means for actuating one of said tools, independent power operable means for actuating another of said tools, means for adjusting one of said tools toward and from the work table without disturbing the relative position of another tool relative to said table, a tracer carried by said slide means for supporting a pattern on the work table, and power operable means controlled by the tracer while in contact with the pattern for determining the resultant direction of relative movement between the ram and the table.

16. In a machine for producing blanking dies, the combination of a pair of power actuable supports, means for holding the blanking die on one of said supports, a roughing and a finishing tool carried by the other support, a pattern and a tracer carried by the respective supports and power operable pilot means controlled by the tracer while in contact with the pattern for governing power actuation of said supports and the resultant direction of movement therebetween.

17. In a machine tool for producing blanking dies from solid stock, the combination of a pair of relatively movable supports, means for securing a blanking die to one of said supports, a roughing tool and a finishing tool carried by the other support, power actuable means for moving said supports, and a tracer mechanism operatively connected for automatically controlling the movement of said supports and the resultant direction of movement along prescribed paths whereby the same tracer mechanism may be utilized for controlling the roughing and the finishing operation.

18. In a machine tool for producing blanking dies from solid stock, the combination of a first support, a blank holding fixture and a pattern mounted on said support, a second support having a roughing tool and a finishing tool mounted thereon in spaced relation, said fixture being shiftable relative to the first support to present the blank selectively to said tools, stops carried by the first support for determining the position of said fixture with respect to the different tools, a tracer supported in cooperative relation to the pattern, power operable means for moving the supports, and means operatively coupling the tracer for control of power actuation of said supports.

19. In a machine tool for producing a contoured opening in plate-like blanking dies, the combination of trepanning means for cutting an opening in the blanking die plate, shaping means for finishing said opening, a shiftable holder for the die for selectively positioning the same with respect to each of said means, and a pattern controlled mechanism operatively coupled for controlling relative movement between each of said means and the holder.

BERNARD SASSEN.

CERTIFICATE OF CORRECTION.

Patent No. 2,074,095. March 16, 1937.

BERNARD SASSEN.

It is hereby certified that error appears in the printed specification of the above numbered patent requiring correction as follows: Page 5, second column, line 50, for "counter" read counterclockwise; and that the said Letters Patent should be read with this correction therein that the same may conform to the record of the case in the Patent Office.

Signed and sealed this 1st day of June, A. D. 1937.

(Seal)

Henry Van Arsdale
Acting Commissioner of Patents.